US006944566B2

(12) United States Patent
Chen et al.

(10) Patent No.: US 6,944,566 B2
(45) Date of Patent: Sep. 13, 2005

(54) METHOD AND SYSTEM FOR MULTI-SENSOR DATA FUSION USING A MODIFIED DEMPSTER-SHAFER THEORY

(75) Inventors: Hai-Wen Chen, Orlando, FL (US); Teresa L. Olson, Winter Garden, FL (US)

(73) Assignee: Lockheed Martin Corporation, Orlando, FL (US)

( * ) Notice: Subject to any disclaimer, the term of this patent is extended or adjusted under 35 U.S.C. 154(b) by 29 days.

(21) Appl. No.: 10/395,215

(22) Filed: Mar. 25, 2003

(65) Prior Publication Data

US 2003/0191610 A1 Oct. 9, 2003

Related U.S. Application Data

(60) Provisional application No. 60/367,282, filed on Mar. 26, 2002.

(51) Int. Cl.[7] .............................................. G06F 19/00

(52) U.S. Cl. ...................................... 702/116; 324/614

(58) Field of Search ............................... 702/69, 75–76, 702/106–107, 104, 116, 181, 189, 191, 193, 195; 706/19–23; 700/89; 324/511, 612–614

(56) References Cited

U.S. PATENT DOCUMENTS

| | | | | | |
|---|---|---|---|---|---|
| 6,031,870 | A | * | 2/2000 | Walley ........................ | 375/239 |
| 6,404,380 | B2 | * | 6/2002 | Poore, Jr. .................... | 342/96 |
| 6,429,812 | B1 | * | 8/2002 | Hoffberg .................. | 342/357.1 |
| 6,448,562 | B1 | * | 9/2002 | Seidler et al. .............. | 250/372 |
| 6,527,729 | B1 | * | 3/2003 | Turcott ....................... | 600/528 |
| 6,670,909 | B2 | * | 12/2003 | Kim ........................... | 342/50 |
| 6,683,564 | B1 | * | 1/2004 | McBurney ............. | 342/357.02 |
| 6,701,133 | B1 | * | 3/2004 | Bennett et al. ............... | 455/71 |

OTHER PUBLICATIONS

Wang et al., "On the Uncertainty and Ignorance of Statistical Decision and Evidence Combination", Dec. 1996, Multisensor Fusion and Integration for Intelligent Systems, 1996. IEEE/SICE/RSJ International Conference on, pp. 166–173.*

Buede, "Shafer–Dempster and Bayesian reasoning: a response to 'Shafer–Dempster reasoning with applications to multisensor target identification systems'", Nov.–Dec. 1988, Systems, Man and Cybernetics, IEEE Transactions on, vol. 18 iss. 6, pp. 1009–1011.*

Siegel et al. "Sensor fusion using Dempster–Shafer theory", May 2002, Instrumentation and Measurement Technology Conference, 2002. IMTC/2002. Proceedings of the 19th IEEE, vol. 1, pp. 7–12.*

* cited by examiner

Primary Examiner—Marc S. Hoff
Assistant Examiner—Mary Catherine Baran
(74) Attorney, Agent, or Firm—Birch, Stewart, Kolasch & Birch, LLP (57) ABSTRACT

A multi-sensor data fusion system and method provide an additive fusion technique including a modified belief function (algorithm) to adaptively weight the contributions from a plurality of sensors in the system and to produce multiple reliability terms including reliability terms associated with noise for low SNR situations. During a predetermined tracking period, data is received from each individual sensor in the system and a predetermined algorithm is performed to generate sensor reliability functions for each sensor based on each sensor SNR using at least one additional reliability factor associated with noise. Each sensor reliability function may be individually weighted based on the SNR for each sensor and other factors. Additive calculations are performed on the reliability functions to produce at least one system reliability function which provides a confidence level for the multi-sensor system relating to the correct classification (recognition) of desired objects (e.g., targets and decoys).

30 Claims, 4 Drawing Sheets

METHOD AND SYSTEM FOR MULTI-SENSOR DATA FUSION USING A MODIFIED DEMPSTER-SHAFER THEORY

CROSS-REFERENCE

This application claims the benefit of U.S. provisional application Ser. No. 60/367,282, filed Mar. 26, 2002.

TECHNICAL FIELD

The present invention relates generally to data fusion. It particularly relates to a data fusion technique that uses a modified Dempster-Shafer Theory to integrate data from a plurality of sensors.

BACKGROUND OF THE INVENTION

Sensor systems incorporating a plurality of sensors (multi-sensor systems) are widely used for a variety of military applications including ocean surveillance, air-to-air and surface-to-air defense (e.g., self-guided munitions), battlefield intelligence, surveillance and target detection (classification), and strategic warning and defense. Also, multi-sensor systems are used for a plurality of civilian applications including condition-based maintenance, robotics, automotive safety, remote sensing, weather forecasting, medical diagnoses, and environmental monitoring (e.g., weather forecasting).

To obtain the full advantage of a multi-sensor system, an efficient data fusion method (or architecture) may be selected to optimally combine the received data from the multiple sensors to generate a decision output. For military applications (especially target recognition), a sensor-level fusion process is widely used wherein data received by each individual sensor is fully processed at each sensor before being output to a system data fusion processor that generates a decision output (e.g., "validated target" or "no desired target encountered") using at least one predetermined multi-sensor algorithm. The data (signal) processing performed at each sensor may include a plurality of processing techniques to obtain desired system outputs (target reporting data) such as feature extraction, and target classification, identification, and tracking. The processing techniques may include time-domain, frequency-domain, multi-image pixel image processing techniques, and/or other techniques to obtain the desired target reporting data.

Currently, a data fusion method (strategy) that is widely used for multi-sensor systems is multiplicative fusion that uses a predetermined algorithm incorporating a believe function theory (e.g., Dempster's Combination Rule or Dempster-Shafer Evidence Theory, Bayes, etc.) to generate reliability (likelihood or probability) function(s) for the system. During data fusion operation, belief function theories are used to model degrees of belief for making (critical) decisions based on an incomplete information set (e.g., due to noise, out of sensor range, etc.). The belief functions are used to process or fuse the limited quantitative data (clues) and information measurements that form the incomplete information set.

However, many current multi-sensor systems use fusion algorithms which assume a high signal-to-ratio (SNR) for each sensor (ignoring the noise energy level) and therefore generate reliability functions only associated with the desired object (e.g., target, decoy) leading to probability and decision output errors. One well-known belief function theory is the traditional Dempster-Shafer (D-S) theory which is presented in Appendix A. D-S theory may start with a finite (exhaustive), mutually exclusive set of possible answers to a question (e.g., target, decoy, noise for a target detection system) which is defined as the frame of discernment (frame defined by the question). D-S theory may then use basic probability assignments (BPAs) based on the generated elements within an information set (set of all propositions discerned by the frame of discernment) to make decisions. In situations where the frame of discernment includes at three terms, the information set may include singleton (only one element), partial ignorance (at least two elements), and total ignorance (all elements) terms. As shown in Table 1 and Table 2 (in Appendices A,B) for traditional D-S theory, all sensors in the system may assume high SNR to produce a plurality (e.g., four—$\{t\}$, $\{d\}$, $\{t,d\}$, $\{\phi\}$) of BPM mass terms not associated with noise which may lead to (system) decision output errors.

Also, high SNR fusion methods are commonly multiplicative fusion methods which multiply a plurality of probability functions (generated from the received data from each individual sensor) to produce a single term (value). The generation of the single term makes it complex to weight contributions from the plurality of sensors (which may have different reliability values over different tracking time periods due to different sensor constraints, atmospheric conditions, or other factors) and thus may produce a less accurate data fusion output (decision output regarding target classification). Additionally, when the likelihood function readings of the sensors are close to zero, multiplicative fusion may provide a less reliable output.

Therefore, due to the disadvantages of the current multiplicative data fusion methods including belief function theories used for a multi-sensor system, there is a need to provide a multi-sensor system that uses an additive data fusion method including a modified belief function theory for better adaptive weighting and to produce multiple reliability terms including reliability terms associated with noise for low SNR situations.

SUMMARY OF THE INVENTION

The method and system of the present invention overcome the previously mentioned problems by providing a multi-sensor system that performs an additive fusion method including a modified belief function theory (algorithm) to adaptively weight the contributions from a plurality of sensors in the system and to produce multiple reliability terms including reliability terms associated with noise for low SNR situations. During a predetermined tracking period, data is received from each individual sensor in the system and a predetermined algorithm is performed to generate sensor reliability functions for each sensor based on each sensor SNR using at least one additional reliability factor associated with noise. Each sensor reliability function may be individually weighted based on the SNR for each sensor and other factors. Additive calculations are performed on the reliability functions to produce at least one system reliability function which provides a confidence level for the multi-sensor system relating to the correct classification (recognition) of desired objects (e.g., targets and decoys).

DETAILED DESCRIPTION

Figure 1:
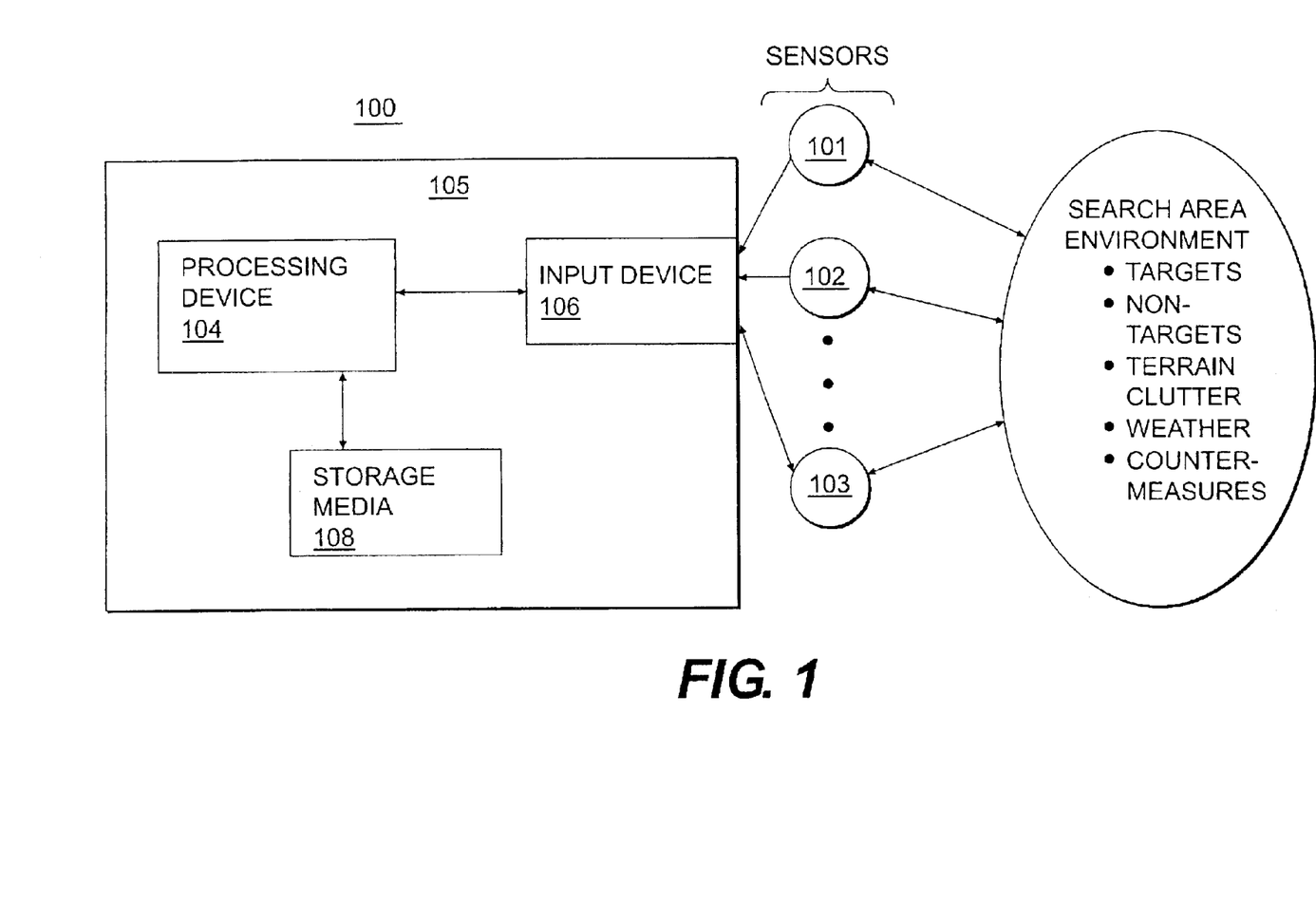
FIG. 1 is a functional block diagram of an exemplary multi-sensor data fusion system found in accordance with embodiments of the present invention.

FIG. 1 shows a functional block diagram of an exemplary multi-sensor, sensor-level data fusion system 100 in accordance with embodiments of the present invention. Advantageously, multi-sensor system 100 may include a plurality of sensors 101, 102, 103, and controller 105 which includes input device 106, processing device 104, and storage media 108. It is noted that the three sensors 101, 102, 103 shown are solely exemplary and system 100 may include any plurality of sensors in accordance with embodiment of the present invention.

Advantageously, plurality of sensors 101, 102, 103 (and associated sensor processors) may receive and compute data from an object (target) within a predetermined scanning area (field of view) where the scanning data may include acoustic, electromagnetic (e.g., signal strength, SNR—signal-to-noise ratio, etc.), motion (e.g., range, direction, velocity, etc.), temperature, and other types of measurements/calculations of the object scanning area.

The plurality of sensors 101, 102, 103, using associated sensor processors, may each perform the well-known process of feature extraction to detect and pull out features which help discriminate the objects in each sensor's field of view and combine all the feature extractions (from each sensor) as a composite input to processing device 104 via input device 106. Processing device 104 may perform all levels of discrimination (detection, classification—recognition, identification, and tracking) of the object (target) using a predetermined data fusion algorithm (as described later) loaded from storage media 108, to recognize the object of interest, differentiate the object from decoys (false targets), and produce at least one (system) weighted, reliability function that links the observed object to a predetermined target with some confidence level. The system reliability function may be used to generate a decision output 110 (target report) for target detection such as "validated target" or "no desired target encountered". Also, alternatively, sensors 101, 102, 103 may feed-through (without processing or with minimal processing) received data to processing device 104, via input device 106, for feature extraction and target discrimination processing.

The particular combination of sensors 101, 102, 103 for system 100 may include a number of different sensors selected to provide exemplary predetermined system attributes (parameters) including temporal and spatial diversity (fusion), sensitivity, bandwidth, noise, operating range, transmit power, spatial resolution, polarization, and other system attributes. These different sensors may include, but are not limited to, passive and/or active sensors operating in the RF (radio frequency) range such as MMW (millimeter-wave) sensors, IR (infrared) sensors (e.g., Indium/Antimony—InSb focal plane array), laser sensors, and other passive and/or active sensors useful in providing the exemplary predetermined system attributes.

Figure 2:
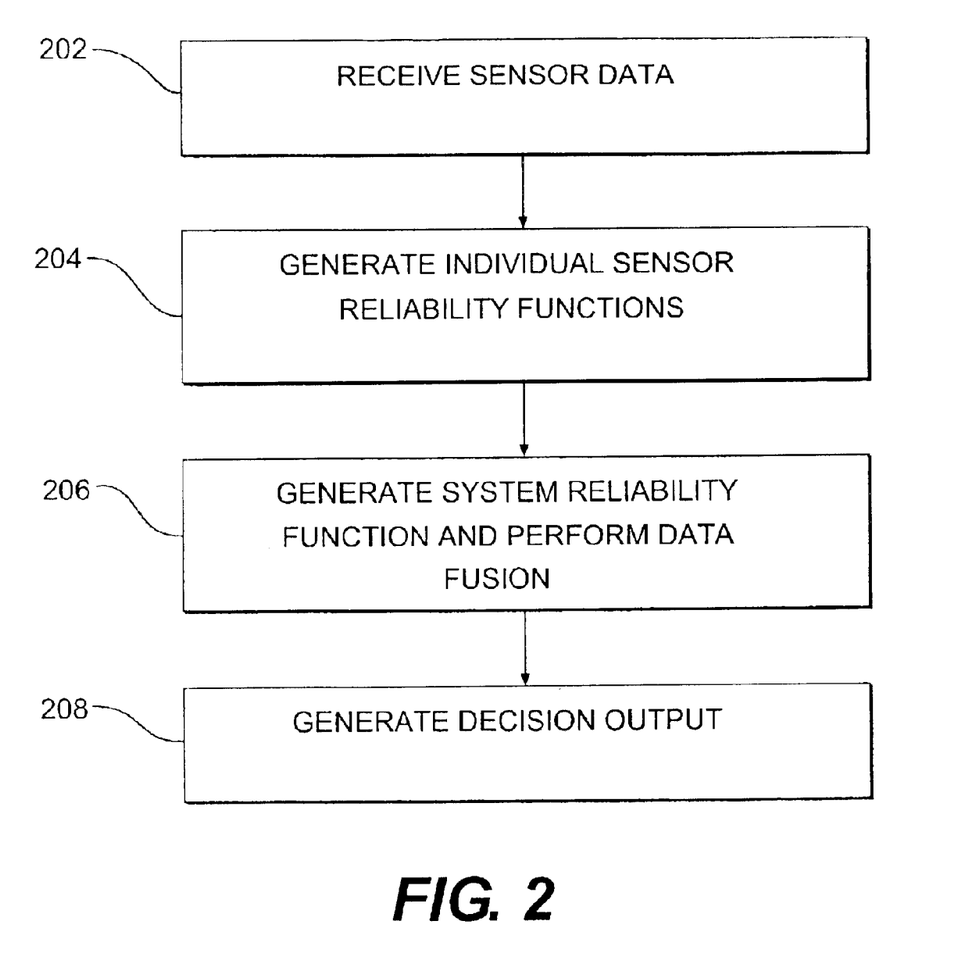
FIG. 2 shows a flowchart of an exemplary data fusion process in accordance with embodiments of the present invention.

During exemplary operation as described herein and in accordance with the flow process diagram shown in FIG. 2, at step 202, each one of the plurality of (differently located) sensors 101, 102, 103 may receive and calculate (compute) data about the object during a predetermined time (tracking) period over a plurality of time frames to provide spatial and temporal diversity for system 100. The computed data may include signal measurements (e.g., noise, radiance, reflection level, etc.) that are used to determine SNR (signal-to-noise ratio) for each sensor during the predetermined tracking period. Thereafter, at step 204, the computed SNR for each one of the plurality of sensors 101, 102, 103 may be used by processing device 104 to generate a sensor reliability function for each sensor including a reliability function associated with noise. Following step 204 of generating individual sensor reliability functions, at step 206 data fusion may be performed by processing device 104 in accordance with a predetermined algorithm (loaded from storage media 108) using adaptive weighting as described in detail later to generate at least one overall (combined) reliability function for system 100. Thereafter, at step 208, a decision output (target report) may be generated using the combined reliability function.

For multi-sensor system 100, there may be variations in sensor reliability among the plurality of sensors 101, 102, 103 (e.g., based on variations in SNR and other factors) during the tracking period such that the processing device 104 (when performing data fusion) may determine and assign a higher weight to a best performing sensor (with the highest SNR) than a (lower) weight assigned to a worse (or worst) performing sensor (e.g., with a lower SNR) such that a fused result (combined reliability function for the plurality of sensors) may be weighted more towards the best performing (highest reliability) sensor. The variations in sensor reliabilities for the plurality of sensors 101, 102, 103 may be caused by a number of factors including weather conditions, different sensor attributes such as better range accuracy of an RF sensor than an IR sensor at longer ranges, or other factors causing at least one sensor to perform better than another sensor during a predetermined tracking period.

Advantageously during operation as described herein, the SNR may be used by processing device 104 as a measure of sensor reliability during a predetermined tracking period to help generate a sensor reliability function for each one of the plurality of sensors 101, 102, 103. Thereafter, processing device 104 may execute (perform) a predetermined data fusion algorithm (loaded from storage media 108) incorporating additive and/or multiplicative calculation (of each individual sensor reliability function) to generate at least one overall (combined) reliability function for the multi-sensor system (full plurality of sensors). As part of generating the overall reliability function (for the plurality of sensors) in accordance with the fusion algorithm (process), processing device 104 may adaptively weight (for a predetermined number of frames) each sensor reliability function based on the SNR (a measure of individual sensor reliability or confidence level) for each sensor during the tracking period. Further description regarding the detailed procedures for adaptive weighting and associated additive calculations are disclosed in the cross-referenced provisional application Serial No. 60/367,282, filed Mar. 26, 2002.

For multi-sensor system 100, likelihood (probability) functions for correct classification ($P_{cc}$) of target and decoy ($P_{cc}$, $P_{ct}$) may be generated by processing device 104 using a predetermined algorithm (loaded from media device 108) including a modified Dempster-Shafer (D-S) belief function theory. Processing device 104 may generate the probability (reliability) functions based on a two-object (e.g., target—t, decoy—d), spatial fusion example (e.g., IR and RF sensor) where the likelihood functions (representing $P_{cc}$) may be expressed as p(t1), p(d1), p(n1) for a first sensor (sensor1—IR) having low SNR during early flight (at longer range to the target), and by p(t2), p(d2) for a second sensor (sensor2—RF) having high SNR, and where the reliability for sensor1 at a particular time frame may be defined as rel1 and the reliability for sensor2 (at the same particular time frame) may be defined as rel2.

In accordance with embodiments of the present invention and as shown in Appendix B, under these conditions (low SNR) the noise from sensor1 (e.g., IR sensor) may be considered to define a frame of discernment having three possibilities (target, decoy, and noise). Four cross probability (multiplicative) terms ([p(t), p(d), p(nt), p(nd)) may be generated from the three possibilities. In response to the additional multiplicative terms associated with noise (p(nt), p(nd)—to handle the low SNR situation), the traditional D-S theory (fusion rule) may be modified. To generate the additional multiplicative terms associated with noise (p(nt), p(nd)), additional BPA masses may be introduced ({n(t)}, {n(d)}) to indicate noise in sensor1 and a target in sensor2, and noise in sensor1 and a decoy in sensor2 occurring at a specific location pair (time frame), respectively.

In accordance with embodiments of the present invention and as shown in Table 3 of Appendix B, the introduction of the additional BPA mass terms {n(t), n(d)} helps to generate additional fused outputs (terms or elements) of the information set for the modified D-S theory which may include the following: {t}, {d}, {ϕ}, {n(t)}, {n(d)}, {t,d}, {n(t), n(d)}, {t, n(t)}, {d,n(d)}, {t,n(t), n(d)}, {t,n(t),n(d)}, {d,n(t),n(d)}, and {t,d,n,n(t),n(d)}. The first five terms are the singleton terms, the $6^{th}$ to the $11^{th}$ terms are the partial ignorance terms, and the last term is the total ignorance term.

Figure 3A:
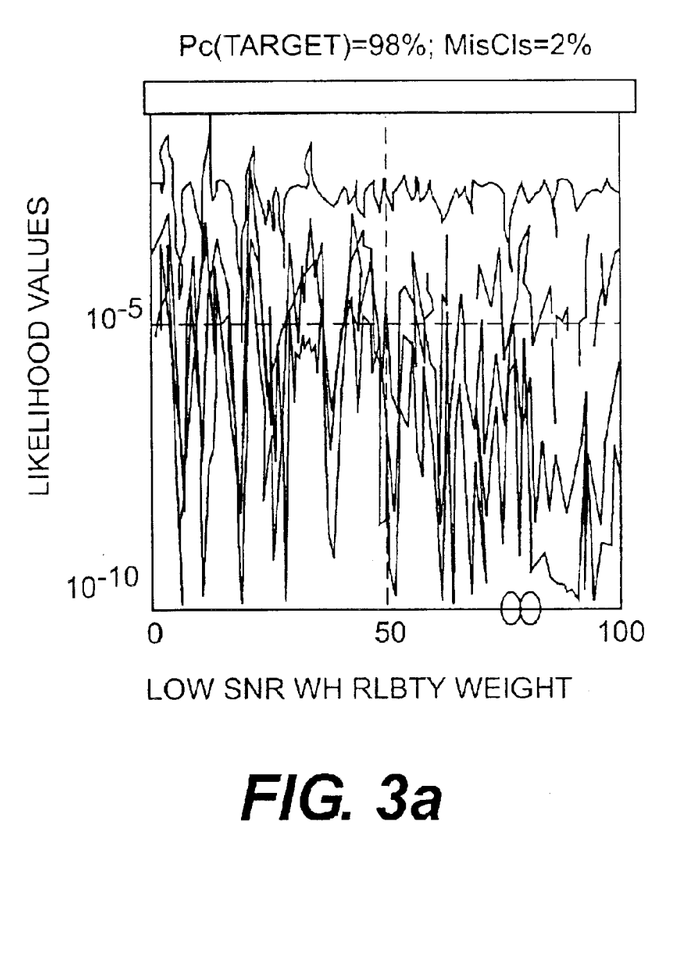
FIG. 3 shows diagrams of exemplary Dempster-Shafer (D-S) fusion theory results for a multi-sensor data fusion system in accordance with embodiments of the present invention.
Figure 3B:
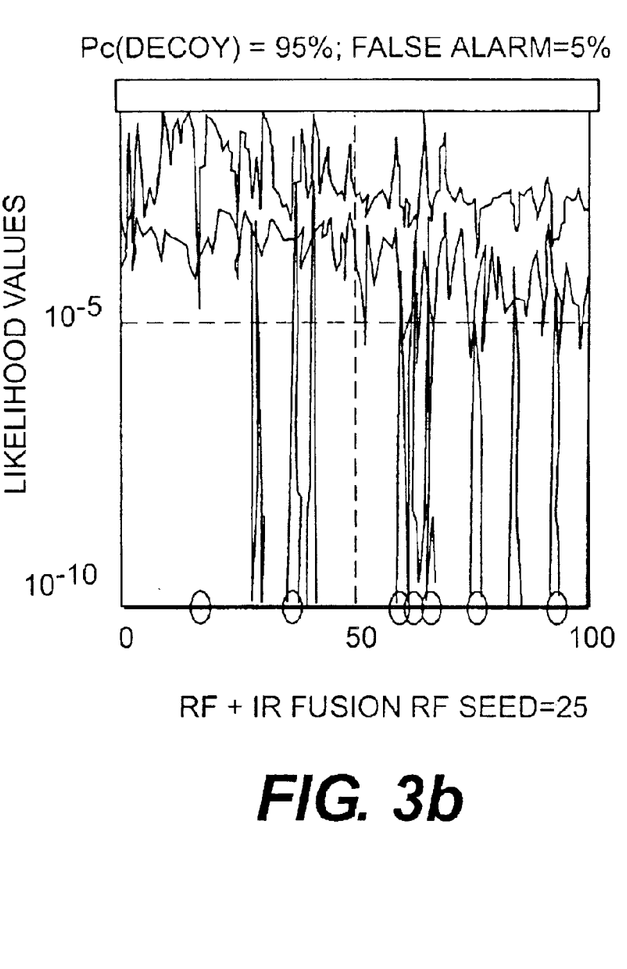
Figure 4:
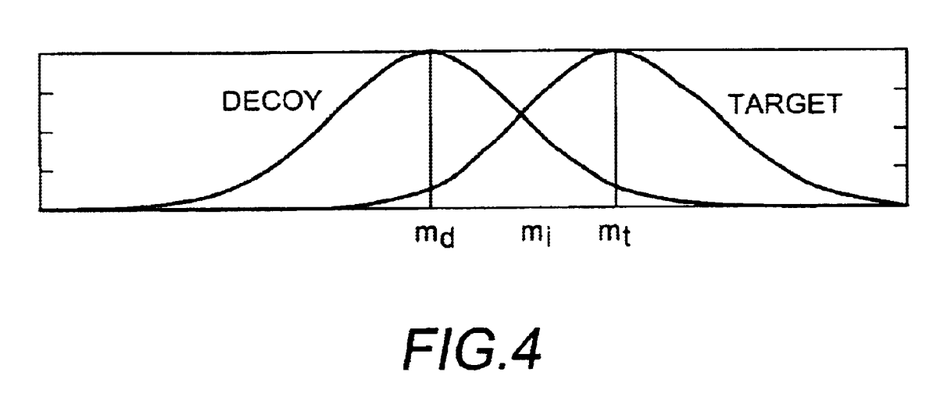
FIG. 4 is a graph of the likelihood function readings for a Dempster-Shafer (D-S) system.

FIG. 3 shows diagrams of exemplary classification results for spatial fusion between the plurality of sensors 101, 102, 103 including an IR and RF sensor. FIGS. 3a, 3b show the resulting diagrams of combined multiplicative and additive fusion using the modified D-S theory described herein using equations (9) and (10) including adaptive weighting from Appendix B. The calculation of equations (9) and (10) is shown in Appendix B and also disclosed (as equations (2) and (3) in Appendix C) in the co-pending patent application, "Method and System for Multi-Sensor Data Fusion".

As shown in FIGS. 3a, 3b the $P_{ct}$ may be improved to 98% and the probability of misclassification ($P_{mc}$) reduced to 2% (as compared to $P_{ct}$ of 96% and $P_{mc}$ of 4% with prior art multiplicative fusion without using reliability weighting), and the $P_{cd}$ may be improved to 95% and the false alarm rate (Rfs (fa,t)) reduced to 5% (as compared to $P_{cd}$ of 89% and Rfs of 11% with prior art multiplicative fusion without using reliability weighting). As shown in FIG. 3b, the Rfs is very low during the early time frames of low SNR condition (e.g., t<50) from using reliability weighting leading to an approximate improvement of $P_{cd}$ to 95% (as compared to $P_{cd}$ of 60% under low SNR conditions using prior art multiplicative fusion without using weighting).

A plurality of advantages may be provided in accordance with embodiments of the present invention including an additive, data fusion method that incorporates a modified D-S theory to produce an additional reliability factor and adaptively weight the contributions from different sensors (within a multi-sensor system) to generate at least one system reliability function. Relying on predetermined measurements and analysis (e.g., testing and/or computer simulation of sensor operation using a high number of random samples), it is determined that multi-sensor system 100 may generate a summation of all partial and total ignorance BPA masses (from the fused output of Table 3 in Appendix B for 300 decoy performance data) that is inversely proportional to the system SNR results allowing the summation to be used as measure of system noise. Also, it is determined that system 100 may generate empty set values that are high (>0.7) over a plurality of frames to indicate that during these frames the measured object may not belong to the object set under consideration showing that additive fusion performs better than multiplicative fusion under these conditions (e.g., low SNR).

Another advantage of the additive fusion technique described herein may be provided when the likelihood function readings (values) are close to zero as occurs when the readings are from the tails of a bell-shaped likelihood function (for each sensor). For this exemplary embodiment, processor 104 may assign (via additive fusion) a greater weight to the sensor contributions from peak readings since readings from the peaks of the likelihood functions are more reliable than the readings from the tails. For an accurate measure of the reliability weighting for this embodiment, processor 104 may use the BPA (basic probability assignment) of the empty sets calculated from the predetermined Dempster-Shafer algorithm as the BPA of the empty sets is near one when the likelihood reading is near zero, and the BPA is near zero when the likelihood reading is near the peak of the likelihood function.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

Appendix A

I. Frame of Discernment

For an exemplary embodiment, given three exhaustive and mutually exclusive objects: target, decoy, and noise, the set w containing these objects may be defined as the frame of discernment:

$$\omega=[t,d,n],\ d(\omega)=3 \tag{1}$$

where d(ω) is the dimension (element number) of the frame of discernment.

II. Referential of Definitions:

A set s with maximum possible elements of $2^{d(\omega)}=8$ may be defined as the referential of definitions:

$$s=[\{t\},\ \{d\},\ \{n\},\ \{t,d\},\ \{t,n\},\ \{d,n\},\ \{t,d,n\},\ \{\phi\}], \tag{2}$$

Where {ϕ} stands for "empty set" (none of the three objects), elements {t}, {d}, {n} may be defined as singleton, {t,d}, {t,n}, and {d,n} may be defined as partial ignorance, and {t,d,n} may be defined as total ignorance.

III. BPA (Basic Probability Assignment) Mass $$0<m\{s(i)\}\leq 1,\ \text{and}\ \Sigma s(i)m\{s(i)\}=1, \tag{3}$$

where i=1, 2, . . . 8.

In an exemplary embodiment, m{t}=0.2, m{d}=0.3, m{n}=0.1, m{t,d,n}=0.2, and m{ϕ}=0.2

IV. Pignistic Probability (P. Smets):

$$P\{\omega(j)\}=\Sigma^i w(j)\epsilon s(i)(m\{s(i)\}/|s(i)|), \tag{4}$$

where i=1, 2, . . . , 8; j=1, 2, 3; and |s(i)| is the cardinality of s(i)

In an exemplary embodiment, for m{t}=0.2, m{t,d}=0.2, and m{t,d,n}=0.6, then $P\{t\}=0.2/1+0.2/2+0.6/3=0.5,$ $P\{d\}=0.2/2+0.6/3=0.3,$ and $P\{n\}=0.6/3=0.2.$

EXAMPLE 1

For the feature at $m_t$ in FIG. A, the two likelihood readings (r) for the D-S system are the following:

$r(t)=1,$ and $r(d)=0.14,$ then $m\{t\}=1-0.14=0.86,$ and $m\{t,d\}=0.14.$

Then, the Pignistic probabilities are the following:

$P\{t\}=0.86+0.14/2=0.93,$ and $P\{d\}=0.14/2=0.07.$

EXAMPLE 2

For the feature at $m_t$ in FIG. A, the two readings for the D-S system are $r(t)=r(d)=0.6.$ Then, $m\{\phi\}=0.4,$ and $m\{t,d\}=0.6.$ Therefore, $P\{t\}=0.3,$ $P\{d\}=0.3,$ and $P\{\phi\}=0.4.$ VI. Dempster's Fusion Combination Rule (Orthogonal Sum ⊕)

$m(A)=m_1 \oplus m_2(A)=1/(1-\text{conflict})\Sigma_{k,l}m_1(B_k)m_2(C_l),$ $Bk \cap C_l = A$     (5)

where $\text{conflict}=\Sigma_{k,l}m_1(B_k)m_2(C_l).$ $B_k \cap C_l \ne A$

For an exemplary two-object problem:

$\omega=[t,d],$ where the computation of equation (5) is illustrated in Table 1, where the first column lists all possible BPA masses for sensor1 and the last row lists all the possible BPA masses for sensor2. The conflict results whenever there is no common object in the BPA mass functions from the two sensors.

TABLE 1

Dempster's Fusion Rule for a Two-Object Problem

| M1{t} | M(t) = m1{t} × m2{t} | Conflict = m1{t} × m2{d} | M(t) = m1{t} × m2{t,d} | Conflict = m1{t} × m2{φ} |
|---|---|---|---|---|
| $m_1\{d\}$ | conflict = $m_1\{d\}$ × $m_2\{t\}$ | m(d) = $m_1\{d\}$ × $m_2\{d\}$ | m(d) = $m_1\{d\}$ × $m_2\{t,d\}$ | conflict = $m_1\{d\}$ × $m_2\{\phi\}$ |
| $m_1\{t,d\}$ | m(t) = $m_1\{t,d\}$ × $m_2\{t\}$ | m(d) = $m_1\{t,d\}$ × $m_2\{d\}$ | m(t,d) = $m1\{t,d\}$ × $m_2\{t,d\}$ | conflict = $m_1\{t,d\}$ × $m_2\{\phi\}$ |
| $m_1\{\phi\}$ | conflict = $m_1\{\phi\}$ × $m_2\{t\}$ | conflict = $m_1\{\phi\}$ × $m_2\{d\}$ | conflict = $m_1\{\phi\}$ × $m_2\{t,d\}$ | m{φ} = $m_1\{\phi\}$ × $m_2\{\phi\}$ |

EXAMPLE 3

Take the readings from Examples 1 and 2:

| $m_1\{t\}$ | | m(t) = 0.516 | conflict = 0.344 |
|---|---|---|---|
| $m_1\{t,d\}$ = 0.14 | | m(t,d) = 0.084 | conflict = 0.056 |
| | | $m_1\{t,d\}$ = 0.6 | $m_1\{\phi\}$ = 0.4 |

Using equation (5), the fused results are:

$m_f(t)=0.516/(1-0.4)=0.86,$ $m_f(t,d)=0.084/(1-0.4)=0.14.$

From this example, the fused results are the same as sensor1 since the element in sensor2 is a total ignorance that does not contribute to the fused result.

Appendix B

Modified Dempster's Fusion Rule (D-S Theory) with Noise Low SNR Situations

Assuming a two-object (target and decoy) classification problem using two sensors (e.g., IR and RF sensor), likelihood readings for sensor1 (IR) are p(t1), p(d1), p(n1) under low SNR (noise to be considered), and p(t2), p(d2) for sensor2 (RF).

Four cross probability (multiplicative) terms for a specific location pair between the two sensors (IR and RF) may be defined as follows:

$p(t)=p(t1)*p(t2), p(d)=p(d1)*p(d2)$ $p(n)=p(n1)*p(t2),$ and $p(nd)=p(n1)*p(d2).$     (7)

Modified Dempster's Fusion Rule

TABLE 2

Low SNR for sensor1 (IR) and High SNR for Sensor2 (RF)

| {t} | {t} | ~ | {t} | ~ |
|---|---|---|---|---|
| {d} | ~ | {d} | {d} | ~ |
| {n} | ~ | ~ | ~ | ~ |
| {t,d} | {t} | {d} | {t,d} | ~ |
| {t,n} | {t} | ~ | {t} | ~ |
| {d,n} | ~ | {d} | {d} | ~ |
| {t,d,n} | {t} | {d} | {t,d} | ~ |
| {φ} | ~ | ~ | ~ | {φ} |
| | {t} | {d} | {t,d} | {φ} |

TABLE 3

Modified Dempster-Shafer Fusion Rule

| {t} | {t} | ~ | {t} | ~ |
|---|---|---|---|---|
| {d} | ~ | {d} | {d} | ~ |
| {n} | {n(t)} | {n(d)} | {n(t),n(d)} | ~ |
| {t,d} | {t} | {d} | {t,d} | ~ |
| {t,n} | {t,n(t)} | {n(d)} | {t,n(t),n(d)} | ~ |
| {d,n} | {n(t)} | {d,n(d)} | {d,n(t),n(d)} | ~ |
| {t,d,n} | {t,n(t)} | {d,n(d)} | {t,d,n(t),n(d)} | ~ |
| {φ} | ~ | ~ | ~ | {φ} |
| | {t} | {d} | {t,d} | {φ} |

The exemplary embodiment, using the traditional D-S theory, where the IR sensor has a low SNR and the RF sensor has a high SNR is illustrated in Table 2 (m symbol for mass has been deleted for clarity, and ~ stands for conflict).

In accordance with embodiments of the present invention, the modified D-S theory is shown in Table 3. To obtain the multiplicative probability term involving noise as shown in equation (7), two additional BPA masses ({n(t)}, {n(d)}) have been introduced where {n(t)} indicates the BPA mass representing the situation that both the noise in sensor1 and the target in sensor2 occurred at a specific location pair, and {n(d)} indicates the BPA mass representing the situation that both the noise in sensor1 and the decoy in sensor2 occurred at the same location pair. Therefore, $$m\{n(t)\}=m_1(n)X\ m_2(t),\ \text{and}\ m\{n(d)\}=m_1(n)X\ m_2(d). \quad (8)$$

As shown in Table 3, the two additional BPA mass terms {n(t)}, {n(d)} generate eight additional BPA mass terms for the fused output in addition to the four original terms to produce a total of twelve terms which include the following:

{t}, {d}, {φ}, {n(t)}, {n(d)}, {t,d}, {n(t), n(d)}, {t,n(t)}, {d,n(d)}, {t,n(t), n(d)}, {t,n(t), n(d)}, {d,n(t), n(d)}, and {t, d,n,n(t), n(d)}.

where the first five terms are the singleton terms, the $6^{th}$ to the $11^{th}$ terms are the partial ignorance terms, and the last term is the total ignorance term.

Determination of Relative Reliability for Two-Object, Two-Sensor Example

For $0 \leq rel(t) \leq 1$, a reliability function, "rel(t)", may be defined as a linear function of signal-to-noise ratio (SNR):

$$rel(t)=\{a*SNR(t),\ \text{or}\ 1\ \text{if}\ rel(t)>1, \quad (25)$$

where a is a linear coefficient, and t is a time frame number.

If rel2(sensor2)>rel1(sensor1), then the relative reliability (rrel) may be expressed as:

$$rrel1=rel1/rel2,\ \text{and}\ rrel2=rel1/rel2=1.$$

For an exemplary scenario, if rel1=0.6 and rel2=0.8, then $$rrel1=0.6/0.8=0.75,\ \text{and}\ rrel2=0.8/0.8=1.$$

For rel2>rel1, a combination of additive and multiplicative fusion may be expressed as:

$$P\{t\}=rrel1*[p\{t1\}*p\{t2\}]+(1-rrel1)*p\{t2\}, \quad (9)$$

$$P\{d\}=rrel1*[p(d1)*p(d2)]+(1-rrel1)*p(\{2\}). \quad (10)$$

What is claimed is:

1. A method for integrating data received by a plurality of sensors, comprising:
   receiving data that is received by a plurality of sensors;
   for each sensor, determining SNR (signal-to-noise ratio) of individually received data based on signal measurements to generate a sensor reliability function; and
   determining at least one reliability function for the plurality of sensors as a predetermined additive calculation of each sensor reliability function using a predetermined algorithm for generating at least one additional reliability factor associated with noise for each sensor.

2. The method of claim 1, wherein said at least one additional reliability factor includes at least one of a singleton, partial ignorance, and total ignorance reliability factor.

3. The method of claim 1, wherein said determining at least one reliability function includes using said predetermined algorithm, including a modified algorithm of Dempster-Shafer theory, to generate at least one additional reliability factor associated with noise for each sensor.

4. The method of claim 3, wherein said at least one additional reliability factor is an additional term for a set of basic probability assignment (BPA) mass terms of said modified algorithm of Dempster-Shafer theory.

5. The method of claim 1, wherein said determining a SNR includes determining said SNR for each sensor wherein at least one sensor having a SNR failing to satisfy a predetermined threshold.

6. The method of claim 5, wherein said at least one sensor includes one of an infrared (IR) and radio frequency (RE) sensor.

7. The method of claim 1, wherein said determining at least one reliability function includes determining said at least one reliability function for the plurality of sensors as said predetermined additive calculation of each sensor reliability function wherein each sensor reliability function includes at least one additional reliability term associated with noise.

8. The method of claim 7, wherein said at least one additional reliability term includes at least one of a target and decoy reliability term associated with noise.

9. The method of claim 1, wherein said at least one additional reliability factor includes at least one of a target and a decoy reliability factor associated with noise.

10. A method for integrating data received from a plurality of sensors, comprising:
    receiving data from a plurality of sensors;
    determining a SNR (signal-to-noise ratio) for each sensor based on signal measurements of the received data; and
    determining at least one reliability function for the plurality of sensors as a predetermined additive calculation of each sensor reliability function, based on each sensor SNR, using a predetermined algorithm for generating at least one additional reliability factor associated with noise for each sensor;
    wherein said at least one additional reliability factor includes at least one of a singleton, partial ignorance, and total ignorance reliability factor;
    wherein a summation of said partial and total ignorance factors is inversely proportional to said at least one reliability function.

11. A multi-sensor system, comprising:
    a plurality of sensors for receiving data; and
    a controller for performing the steps of:
    receiving said data from said plurality of sensors;
    for each sensor, determining SNR (Signal-to-noise ratio) of individually received data based on signal measurements to generate a sensor reliability function; and
    determining at least one reliability function for the plurality of sensors as a predetermined additive calculation of each sensor reliability function, using a predetermined algorithm for generating at least one additional reliability factor associated with noise for each sensor.

12. The system of claim 11, wherein said controller to determine said at least one reliability function using said predetermined algorithm, including a modified algorithm of Dempster-Shafer theory, to generate at least one additional reliability factor associated with noise for each sensor.

13. The system of claim 12, wherein said at least one additional reliability factor is an additional term for a set of basic probability assignment (BPA) mass terms of said modified algorithm of Dempster-Shafer theory.

14. The system of claim 11, wherein said controller to determine said SNR for each sensor wherein at least one sensor having a SNR failing to satisfy a predetermined threshold.

15. The system of claim 14, wherein said at least one sensor includes one of an infrared (IR) and radio frequency (RF) sensor.

16. The system of claim 11, wherein said controller to determine said at least one reliability function wherein each sensor reliability function includes at least one additional reliability term associated with noise.

17. The system of claim 16, wherein said at least one additional reliability term includes at least one of a target and decoy reliability term associated with noise.

18. A machine-readable medium having stored thereon a plurality of executable instructions, the plurality of instructions comprising instructions to:

receive data that is received by a plurality of sensors;

for each sensor, determine SNR (signal-to-noise ratio) of individually received data based on signal measurements to generate a sensor reliability function; and determine at least one reliability function for the plurality of sensors as a predetermined additive calculation of each sensor reliability function using a predetermined algorithm for generating at least one additional reliability factor associated with noise for each sensor.

19. The medium of claim 18, wherein said instructions to determine at least one reliability function include using said predetermined algorithm, including a modified algorithm of Dempster-Shafer theory, to generate at least one additional reliability factor associated with noise for each sensor.

20. The medium of claim 19, wherein said at least one additional reliability factor is an additional term for a set of basic probability assignment (BPA) mass terms of said modified algorithm of Dempster-Shafer theory.

21. The medium of claim 18, wherein said instructions to determine a SNR include determining said SNR for each sensor wherein at least one sensor having an SNR failing to satisfy a predetermined threshold.

22. The medium of claim 18, wherein said at least one sensor includes one of an infrared (IR) and radio frequency (RF) sensor.

23. The medium of claim 18, wherein said instructions to determine at least one reliability function includes determining said at least one reliability function wherein each sensor reliability function includes at least one additional reliability term associated with noise.

24. The medium of claim 23, wherein said at least one additional reliability term includes at least one of a target and decoy reliability term associated with noise.

25. A method for integrating data received by a plurality of sensors, comprising:

receiving data that is received by a plurality of sensors;

for each sensor, determining SNR (signal-to-noise ratio) of individually received data based on signal measurements to generate a sensor reliability function; and determining at least one reliability function for the plurality of sensors as a predetermined additive calculation of each sensor reliability function using a predetermined algorithm for generating at least a plural number of additional reliability factors associated with noise for each sensor.

26. The method of claim 25, wherein said determining at least one reliability function includes using said predetermined algorithm to generate at least eight additional reliability factors associated with noise for each sensor.

27. A multi-sensor system, comprising:

a plurality of sensors for receiving data; and a controller for performing the steps of:

receiving said data from said plurality of sensors;

for each sensor, determining SNR (signal-to-noise ratio) for individually received data based on signal measurements to generate a sensor reliability function; and determining at least one reliability function for the plurality of sensors as a predetermined additive calculation of each sensor reliability function using a predetermined algorithm for generating at least a plural number of additional reliability factors associated with noise for each sensor.

28. The system of claim 27, wherein said controller to determine said at least one reliability function using said predetermined algorithm to generate at least eight additional reliability factors associated with noise for each sensor.

29. A machine-readable medium having stored thereon a plurality of executable instructions, the plurality of instructions comprising instructions to:

receive data that is received by a plurality of sensors;

for each sensor, determine SNR (signal-to-noise ratio) for individually received data based on signal measurements to generate a sensor reliability function; and determine at least one reliability function for the plurality of sensors as a predetermined additive calculation of each sensor reliability function using a predetermined algorithm for generating at least a plural number of additional reliability factors associated with noise for each sensor.

30. The medium of claim 29, wherein said instructions to determine at least one reliability function include using said predetermined algorithm to generate at least eight additional reliability factors associated with noise for each sensor.

* * * * *